(12) United States Patent
Tamai et al.

(10) Patent No.: US 6,580,180 B2
(45) Date of Patent: Jun. 17, 2003

(54) POWER SUPPLY APPARATUS FOR VEHICLE

(75) Inventors: Yasuhiro Tamai, Shizuoka-ken (JP); Yoshinori Ikuta, Shizuoka-ken (JP); Takashi Gohara, Shizuoka-ken (JP); Tetsuya Hasegawa, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 105 days.

(21) Appl. No.: 09/819,657

(22) Filed: Mar. 29, 2001

(65) Prior Publication Data

US 2001/0035685 A1 Nov. 1, 2001

(30) Foreign Application Priority Data

Apr. 13, 2000 (JP) .................................. 2000-112613

(51) Int. Cl.[7] ................................................ B60L 1/00
(52) U.S. Cl. ......................... 307/10.1; 307/24; 307/52
(58) Field of Search ............................ 307/10.1, 11, 24, 307/46, 52; 320/116, 118

(56) References Cited

U.S. PATENT DOCUMENTS

| 5,334,926 | A | * | 8/1994 | Imaizumi | 307/16 |
| 5,418,401 | A | * | 5/1995 | Kaneyuki | 307/10.1 |
| 5,798,629 | A | * | 8/1998 | Terauchi | 320/106 |
| 5,929,602 | A | * | 7/1999 | Suzuki | 320/116 |
| 6,271,645 | B1 | * | 8/2001 | Schneider et al. | 320/118 |
| 6,304,059 | B1 | * | 10/2001 | Chalasani et al. | 320/118 |
| 6,384,489 | B1 | * | 5/2002 | Bluemel et al. | 307/10.1 |

* cited by examiner

Primary Examiner—Brian Sircus
Assistant Examiner—Sharon Polk
(74) Attorney, Agent, or Firm—Finnegan, Henderson, Farabow, Garrett, Dunner, L.L.P.

(57) ABSTRACT

A first battery 12 is for supply of power at a first voltage. A second battery 13 is for supply of power at a second voltage to a load 14. A converter 120 is between the first battery 12 and the second battery 13. The converter 120 is for conversion of power between the first voltage and the second voltage in magnitude. A controller 110 is for operation of the converter 120 in dependent on a first current in magnitude through the load 14 and a second current in magnitude at an output terminal of the second battery 13.

8 Claims, 5 Drawing Sheets

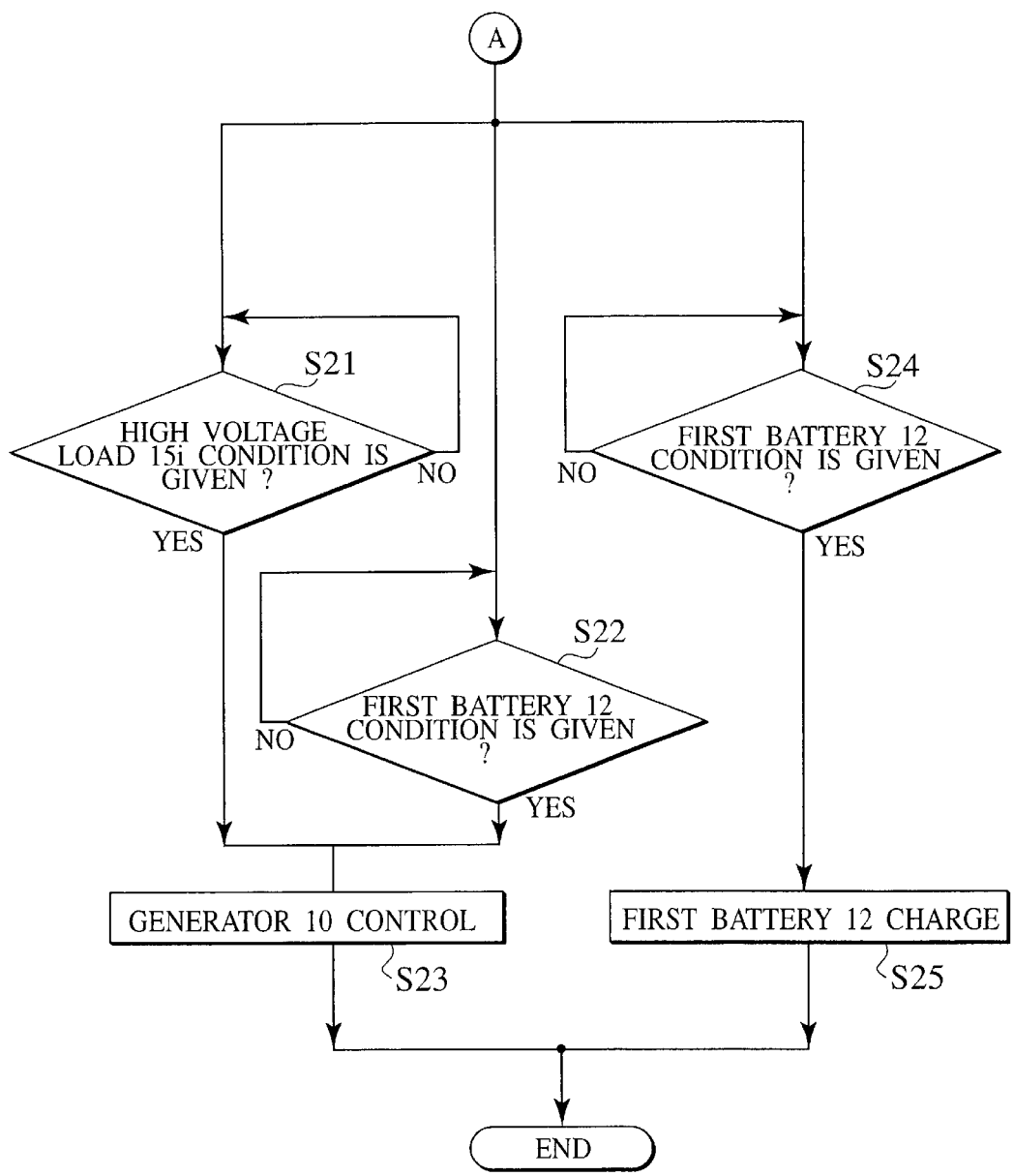

POWER SUPPLY APPARATUS FOR VEHICLE

BACKGROUND OF THE INVENTION

1. Field of the Invention

The present invention relates to a power supply for a vehicle, and more particularly, to a technology for composing a power supply of two systems with different voltages.

2. Description of the Related Art

Conventionally, it has been tried to reduce current flowing through wiring in a vehicle and to reduce the wiring in weight by increasing the power supply voltage of a power supply for a vehicle. However, for instance, loads such as lamp are difficult for application of a high voltage, and these loads are supplied with a low voltage obtained by converting the high voltage through a voltage converter. Consequently, this kind of power supply for a vehicle is provided with a power supply of two systems such as high voltage system and low voltage system.

As an example of such a power supply provided with a power supply of two systems, Japanese Patent Application Laid-Open (JP-A) No. 1-185197 discloses "a Power supply apparatus for a vehicle". This power supply for a vehicle is provided with a switch element between a high voltage system and a low voltage system, and generates a voltage in rectangular pulse-wave with a predetermined duty by switching this switch element in ON or OFF. Then, a power with this rectangular pulse-wave voltage is supplied to a load as a power supply of the low voltage system. In this case, an arbitrary power supply voltage can be generated by changing the duty, as a mean value of rectangular pulse-wave voltage, or the direct current component of the rectangular pulse-wave, becomes the power supply voltage of the low voltage system.

In addition, as a load to which it is difficult to apply the high voltage for example, an ignition coil is cited. This ignition coil should be supplied with a low voltage, but a function error may occur when the aforementioned rectangular pulse-wave voltage is supplied. Therefore, in the conventional power supply for a vehicle, the rectangular pulse-wave voltage to be output from the voltage converter is smoothed by a capacitor before supplying to the ignition coil.

SUMMARY OF THE INVENTION

However, when the rectangular pulse-wave voltage from the voltage converter is smoothed by a smoothing capacitor, a ripple generation can not be inhibited, and a capacitor of large capacity would be necessary to suppress this ripple sufficiently. As a result, there is a drawback that the power supply for a vehicle become expensive and increase in size.

Moreover, in the aforementioned conventional power supply for a vehicle, a ripple generates also in the voltage at the battery, as current from the battery is on or off by the switching element. In order to remove this ripple, in this conventional power supply for a vehicle, such a control is performed that the current flowing out from the battery is always constant, by operating the plurality of loads successively. However, there is a drawback that, when a number of loads are driven simultaneously, a power necessary for each load can not be obtained, as, the plurality of loads are operated successively and the duty of respective voltage pulse-wave is limited.

It can also be devised to use a conventional battery as smoothing capacitor for absorbing the ripple at the battery, however, this battery can not absorb ripple sufficiently, with full charge and without load. Therefore, in this case also, a smoothing capacitor with large capacity will be required.

Moreover, the voltage converter, consuming power for its operation, lowers the conversion efficiency when the load current is low.

The present invention has been made to solve these problems, and it is an object of the present invention to provide a power supply for a vehicle whose low power in its power consumption and small sizing are allowed and which is inexpensive.

An aspect of the invention provides the following power supply apparatus for a vehicle. The apparatus includes a first battery for supply of power at a first voltage. The apparatus includes a second battery for supply of power at a second voltage to a load. The apparatus includes a converter between the first battery and the second battery. The converter is for conversion of power between the first voltage and the second voltage in magnitude. The apparatus includes a controller for operation of the converter in dependent on a first current in magnitude through the load and a second current in magnitude at an output terminal of the second battery.

Preferably, the power supply apparatus further includes: a first sensor for detection of the first current in magnitude; and a second sensor for detection of the second current: in magnitude. The controller stops the converter when a first detected current is less in magnitude than first specified and a second detected current is less in magnitude than second specified.

Preferably, the power supply apparatus further includes: a switch between the second battery and the load for operation in response to the controller; and a second sensor for detection of the second current in magnitude. The controller stops the converter when the switch is opened and a second detected current is less in magnitude than specified.

Preferably, the power supply apparatus further includes a third sensor for detection of a third current at an output terminal of the converter. The controller stops the converter when a third detected current is less in magnitude than specified and has a ripple greater in level than specified.

Preferably, the converter is started when power is started to be supplied to the load.

Preferably, the controller operates the converter to convert power from the second voltage to the first voltage in dependent on the first current and the second current in magnitude for charge of the first battery.

Preferably, the power supply apparatus further includes a generator for generation of power and for charge of the first battery. The controller operates the generator to be reduced in amount of power generation.

Preferably, the power supply apparatus further includes another load for supply of power from the first battery.

As described above, according to the aspect of the invention, the power supply apparatus for a vehicle is to be reduced Ln its power consumption, as the voltage converter is stopped in the voltage conversion operation according to the first and second currents in magnitude flowing at the output terminal of the second battery and through the second load, and the voltage converter does not consume power. In addition, no ripple is generated in the output with a second voltage from the second battery, when the voltage converter is stopped in voltage conversion operation, and the second battery is to be used as a smoothing capacitor during the voltage conversion operation of the voltage converter, making unnecessary to dispose another smoothing capacitor separately, in any state. As a result, the power supply apparatus for a vehicle is to be reduced in size, and price.

According to the preferable aspect of the invention, the voltage converter is stopped in the voltage conversion operation when the first current in magnitude to be detected by the first sensor is equal or inferior to a first predetermined magnitude (no load state) and the second current in magnitude to be detected by the second sensor is equal or inferior to a second predetermined magnitude (full charged load state), allowing to deploy the identical function and effect as the aforementioned invention of the first aspect.

In addition, according to the preferable aspect of the invention, it is unnecessary to detect the first current in magnitude flowing through the load, as the controller indicates the switch to open, allowing to detect the second battery in no load state. As a result, the first sensor becomes unnecessary, and the power supply apparatus for a vehicle is constituted at a low cost.

According to the preferable aspect of the invention, the voltage converter is stopped in its voltage conversion operation when the third current in magnitude to be detected by the third sensor is equal or inferior to a predetermined magnitude and has ripple equal or superior to a predetermined level, making unnecessary to detect the second current in magnitude flowing at the output terminal of the second battery. As a result, the second sensor for detecting the second current in magnitude flowing at the output terminal of the second battery is unnecessary, allowing to compose the power supply for a vehicle at a low cost.

According to the preferable aspect of the invention, the second battery is to be prevented from its excessive charge at no load thereof, as the voltage converter starts the voltage conversion operation when power supply to the load starts from a stop state thereof. The second battery is prevented from voltage drop to occur when the power supply starts.

In addition, according to the preferable aspect of the invention, the voltage converter starts the voltage conversion operation from the second voltage to the first voltage in magnitude according to the first and second currents in magnitude flowing at the output terminal of second battery and through the load, and the first battery starts to be charged. Therefore, for instance, the first battery is charged when the second battery decreases in the second current flowing at its output terminal to be in the full charge state, and at the identical time, the load decreases in the first current flowing therethrough to be in no load state, allowing to keep the first battery in charge state all the times. Moreover, the second battery is prevented from deterioration due to additional take-out of current, when the second battery in its remaining capacity is low.

According to the preferable aspect of the invention, the first battery is to be prevented from an excessive discharge, as the voltage converter starts the inverse voltage conversion operation according to the first and second currents in magnitude flowing at the output terminal of the second battery and through the load, and the first battery starts to be charged. In addition, the inverse voltage conversion operation is performed when the second battery is in no load state and full charge state, and the second battery is prevented from deterioration due to additional take-out of current when the second battery in its remaining capacity is low.

According to the preferable aspect of the invention, the controller controls the first battery to be charged when the second battery is in no load state and full charge state, and further, the controller controls the generator to be reduced in its power consumption. Thus, the generator is to be reduced in its amount of power generation and is to be improved in its fuel cost.

BRIEF DESCRIPTION OF THE DRAWINGS

FIG. 6 is a flow chart showing a control procedure of a fourth embodiment.

DESCRIPTION OF THE PREFERRED EMBODIMENTS

Now embodiments of the present invention will be described referring to drawings. In the following embodiments, voltage converter is disposed in a junction box, and they are constituted integrally, but, the voltage converter and the junction box for controlling constituent elements in the junction box can be constituted separately. When the voltage converter and the junction box are constituted integrally as this embodiment, a microcomputer (called "MPU", hereinafter) can be used in common advantageously for controlling the voltage converter.

First Embodiment

Figure 1:
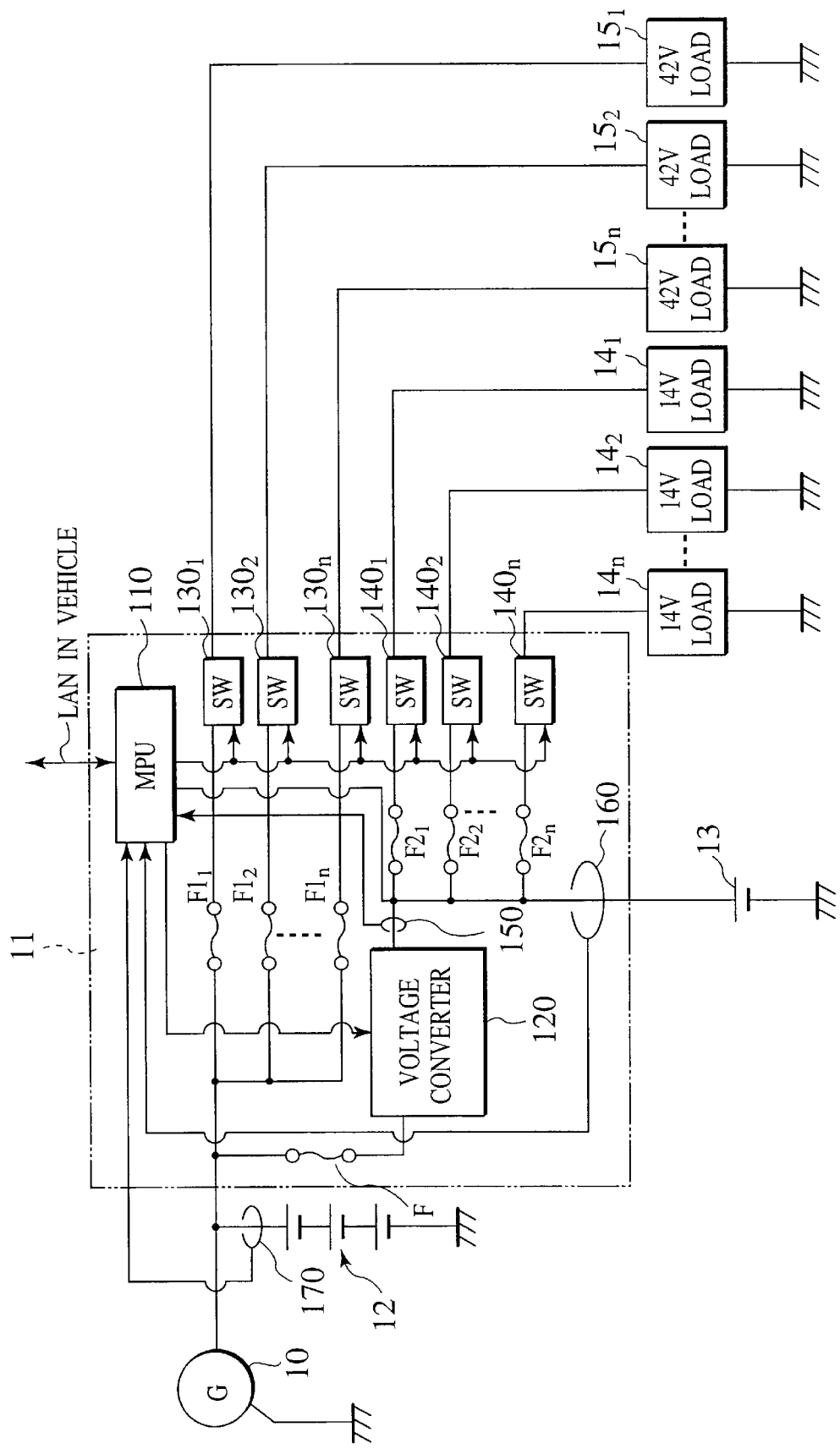
FIG. 1 is a block diagram showing a constitution of a power supply for a vehicle according to first to third embodiments of the present invention.

FIG. 1 is a block diagram showing a of a power supply for a vehicle according to first embodiment of the present invention. This power supply for a vehicle includes a generator 10, a junction box 11, a first battery 12, a second battery 13, low voltage loads $14_1$ to $14_n$ (represented by $14i$) and high voltage loads $15_1$ to $15_n$ (represented by $15i$).

The generator 10 is driven by the rotation of an engine (not shown) to generate a direct power. Direct power to be generated by this generator 10 is supplied to the junction box 11 and the first battery 12.

The first battery 12 is a storage battery for accumulating and outputting a power with a high voltage, for instance, at about 42 volts. This first battery 12 is to be charged by the direct current from the generator 10. The high voltage power to be output from this first battery 12 is supplied to the junction box 11.

The second battery 13 is a storage battery for accumulating and outputting a power with a low voltage, for instance, at about 12 volts. This second battery 13 is to be charged by the direct current from the junction box 11. The low voltage power to be output from this second battery 13 is supplied to the junction box 11.

Low voltage loads $14_l$ to $14_n$ correspond to a load of the present invention, and includes lamps such as a head light, a tail lamp, an interior light and the like and ignition plug and others. These low voltage loads $14_l$ to $14_n$ are to be driven by the low voltage power to be supplied from the junction box 11.

High voltage loads $15_l$ to $15_n$ correspond to another load of the present invention, and includes electric motors for driving, for example, a wiper, a power window and others. These high voltage loads $15_1$ to $15_n$ are driven by a high voltage power supplied from the junction box 11.

The junction box 11 distributes the direct power supplied from the first battery 12 to the respective loads and, at the same time, supplies to the second battery 13. This junction box 11 includes a MPU 110, a voltage converter 120 such as a direct current chopper, switches $130_1$ to $130_n$ (represented by $130_i$) and $140_1$ to $140_n$ (represented by $140_j$), a load current sensor 150, a battery current sensor 160 and fuses $F1_1$ to $F1_n$ and $F2_1$ to $F2_n$.

The MPU 110 controls this whole power supply for a vehicle. Lines of control terminals of the switches $130_1$ to $130_n$ and $140_1$ to $140_n$, the load current sensor 150, the battery current sensor 160 and LAN (Local Area Network) in vehicle are connected to this MPU 110. The power supply terminal of this MPU 110 is connected to the second battery 13 and supplied with power from the second battery 13.

This MPU 110 controls stop and start of the voltage conversion operation of the voltage converter 120, for example, based on signals from the load current sensor 150 and the battery current sensor 160. In addition, the MPU 110 controls open or close of switches $130_1$ to $130_n$ and $140_1$ to $140_n$. Moreover, the MPU 110 transmits and receives signal with the other parts (not shown) of the vehicle through the LAN in the vehicle. For instance, a signal from a light switch (not shown) for turning on the head light is sent to the MPU 110 through the LAN in the vehicle at a rate of once per several to tens of milliseconds. As mentioned below, the MPU 110 turns on the head light based on a signal from the LAN in the vehicle.

The voltage converter 120 at its input terminal is connected to the first battery 12 through the fuse F. On the other hand, it at its output terminal is connected respectively to the switches $130_1$ to $130_n$ through the fuses $F2_1$ to $F2_n$ and to the MPU 110 and the second battery 13.

This voltage converter 120 generates a voltage in a rectangular pulse-wave with a predetermined duty from a high voltage (direct current voltage of 42 volts), the high voltage to be supplied to the input terminals from the generator 10 and the first battery 12 through the fuse F. The converter 120 outputs it from the output terminal as power with a low voltage (rectangular pulse-wave voltage of mean value of 12 volts). Moreover, this voltage converter 120 starts or stops the voltage conversion operation in response to a control signal from the MPU 110.

The switches $130_1$ to $130_n$ at their input terminals are connected to the first battery 12 respectively through the fuses $F1_1$ to $F1_n$. While the switches $130_1$ to $130_n$ at their output terminals are connected respectively to high voltage loads $15_1$ to $15_n$. A respective switch $130_1$ to $130_n$ opens or closes in response to the control signal input to the control terminal thereof from the MPU 110, thus to supply power with direct current from the first battery 12 to the high voltage loads $15_1$ to $15_n$.

The switches $140_1$ to $140_n$ at their input terminals are connected to the second battery 13 respectively through the fuses $F2_1$ to $F2_n$. While the switches $140_1$ to $140_n$ at their output terminals are connected respectively to low voltage loads $14_1$ to $14_n$. A respective switch $140_1$ to $140_n$ opens or closes in response to the control signal input to the control terminal thereof from the MPU 110, thus to supply power of direct, current from the second battery 13 to the high voltage loads $14_1$ to $14_n$.

The load current sensor 150 is disposed in the vicinity of the voltage converter 120 to detect the current in magnitude to be output from this voltage converter 120. The current magnitude to be detected by this load current sensor 150 is sent to the MPU 110.

The battery current sensor 160 is disposed in the vicinity of the input or output terminal of the second battery 13, and detects the current in magnitude to be input or output from this second battery 13. The current magnitude to be detected by this battery current sensor 160 is sent to the MPU 110.

Next, the operation of the power supply for a vehicle according to the first embodiment of the present invention with the constitution will be described. The following explanation will be made on condition that the head light is allocated to the low voltage load $14_1$.

First of all, the generator 10 starts to generate electricity when the ignition switch (not shown) is turned on. At this time, when the output voltage from the first battery 12 is lower than a predetermined magnitude, the first battery 12 is charged with power of direct current from the generator 10. Power of direct current at 42 volts output from the first battery 12 is supplied to the voltage converter 120 through the fuse $F1_1$ and $F1_n$, and is supplied to the switches $130_1$ to $130_n$ at their input terminals respectively.

The MPU 110 starts to be operated by the power of direct current from the second battery 13 when the ignition switch is turned on, thus to generate a control signal for instruction of start for the voltage conversion to be transmitted to the voltage converter 120. The voltage converter 120 starts the voltage conversion in response to this control signal (Step 2 in FIG. 4). That is, the voltage converter 120 converts a high voltage at 42 volt into a low voltage at 12 volt to be output from its output terminal, with the high voltage being supplied to its input terminal from the first battery 12. At this time, when the output voltage magnitude from the second battery 13 is lower than the predetermined magnitude, the second battery 13 is charged with power of direct current from the voltage converter 120.

Power of direct current at 12 volt output from the second battery 13 is supplied to the MPU 110 and, at this time, to the switches $140_1$ to $140_n$ at their input terminals respectively through the and fuses $F2_1$ to $F2_n$. Thereby, the power supply for a vehicle input in a the steady state.

In this steady state, when the light switch (not shown) for turning on the head light is operated, a driving instruction signal for instructing to drive the head light is transmitted to the MPU 110 through the LAN in the vehicle. Upon receiving this headlight driving instruction signal, the MPU 110 generates a control signal for instructing to close the switch and supplies to the switch $140_1$ at its control terminal. Thereby, the switch $140_1$ is closed and power from the second battery 13 is supplied to the low voltage load $14_1$ so that the head light is turned ON.

In this steady state, the MPU 110 starts to monitor the load state, taking periodically the current magnitude from the load current sensor 150 and, at the same time, starts to monitor the second battery 13 in state, taking periodically the current magnitude from the battery current sensor 160. In short, the MPU 110 starts to check the second battery 13 in no load state and full charge state or not (Step 3 in FIG. 4).

This check is performed as follows (first method). In short, the current to be output from the voltage converter 120 mainly includes a load current supplied to low voltage load $14_1$ to $14_n$ and a charge current supplied to the second battery 13. The load current does not flow in no load state (state where all switches $140_1$ to $140_n$ are open). The charge current does not flow neither, if the second battery 13 is fully charged.

Therefore, both the current magnitude detected by the load current sensor 150 and the current magnitude detected by the battery current sensor 160 are low. There, the MPU 110 detects that the second battery 13 is in no load state and full charge state in case when the current magnitude detected by the load current sensor 150 is lower than the first predetermined magnitude and the current magnitude detected by the battery current sensor 160 is lower than the second predetermined magnitude.

The check can also be performed by another method (second method). Namely, as the MPU 110 receives driving instruction signal of low voltage load $14_l$ to $14_n$ from the LAN in vehicle, it can be known if the second battery 13 is in no load state by checking the presence or absence of this driving instruction signal.

Therefore, the MPU 110 detects that the second battery 13 is in no load state and full charge state in case when there is no driving instruction signal of low voltage load $14_l$ to $14_n$ and the current magnitude detected by the battery current sensor 160 is lower than the predetermined magnitude. This method has a merit to make the load current sensor 150 unnecessary.

Said check can also be performed by still another method (third method). When fully charged, the second battery 13 can not absorb ripple and function as capacitor. As a result, ripple at the output terminal of the second battery 13 increases in voltage. In this case, the voltage ripple tends to increase as the load increase, and it can not be judged that the second battery 13 is in full charge state simply because the ripple has increased.

There, the MPU 110 judges that the second battery 13 is in no load state when the current magnitude detected by the load current: sensor 150 is lower than the predetermined magnitude, and judges that the second battery 13 is in full charge state in case when the ripple is lower at a level in the current magnitude detected by the load current sensor 150 than at a predetermined level. This method has a merit to make the battery current sensor 160 unnecessary. In this third method, it can also be judged that the second battery 13 is in no load state when there is no driving instruction signal of low voltage load $14_l$ to $14_n$, as in the second method.

Upon detecting that the second battery 13 is in no load state and full charge state as mentioned above, the MPU 110 generates a control signal instructing to stop the voltage conversion and transmits it to the voltage converter 120. The voltage converter 120 stops the voltage conversion in response to this control signal (step 4 in FIG. 4). Thereby, the voltage converter 120 is controlled in the power consumption, allowing this power supply for a vehicle to be reduced in the power consumption. Also, ripple is not generated in output at the second battery 13 by stopping the voltage converter 120 in the voltage conversion operation.

In the power supply for a vehicle constituted as described above, if the second battery 13 is not fully charged, the voltage converter 120 performs the voltage conversion operation and supplies the second battery 13 with rectangular pulse-wave voltage. However, in case when the second battery 13 is not fully charged, the second battery 13 acts as smoothing capacitor, and therefore, ripple of the rectangular pulse-wave voltage output from the voltage converter 120 is absorbed and smoothed.

As a result, a smoothed voltage can be obtained at the output terminals (input or output terminal of the of the second battery 13) voltage converter 120 independently of the voltage conversion operation by the voltage converter 120, it becomes unnecessary to provide the output terminals of the voltage converter 120 with a large capacity capacitor, making, therefore, the power supply for a vehicle smaller and less expensive.

Second Embodiment

A power supply for a vehicle according to this second embodiment intends to suppress ripple generated at the input or output terminal of the second battery 13 in case when the low voltage load 141 to $14_n$ are driven during the stop of the voltage conversion operation by the voltage converter 120.

The constitution of this power supply for a vehicle according to the second embodiment is similar to that shown in the block diagram of FIG. 1, except for the operation of the MPU 110.

In the aforementioned power supply for a vehicle according to the first embodiment, in case when low voltage load 141 to $14_n$ are driven during the stop of the voltage conversion operation by the voltage converter 120, the second battery 13 has a case to drop suddenly in output voltage. In order to avoid such situation, the MPU 110 functions as follows.

Figure 4:
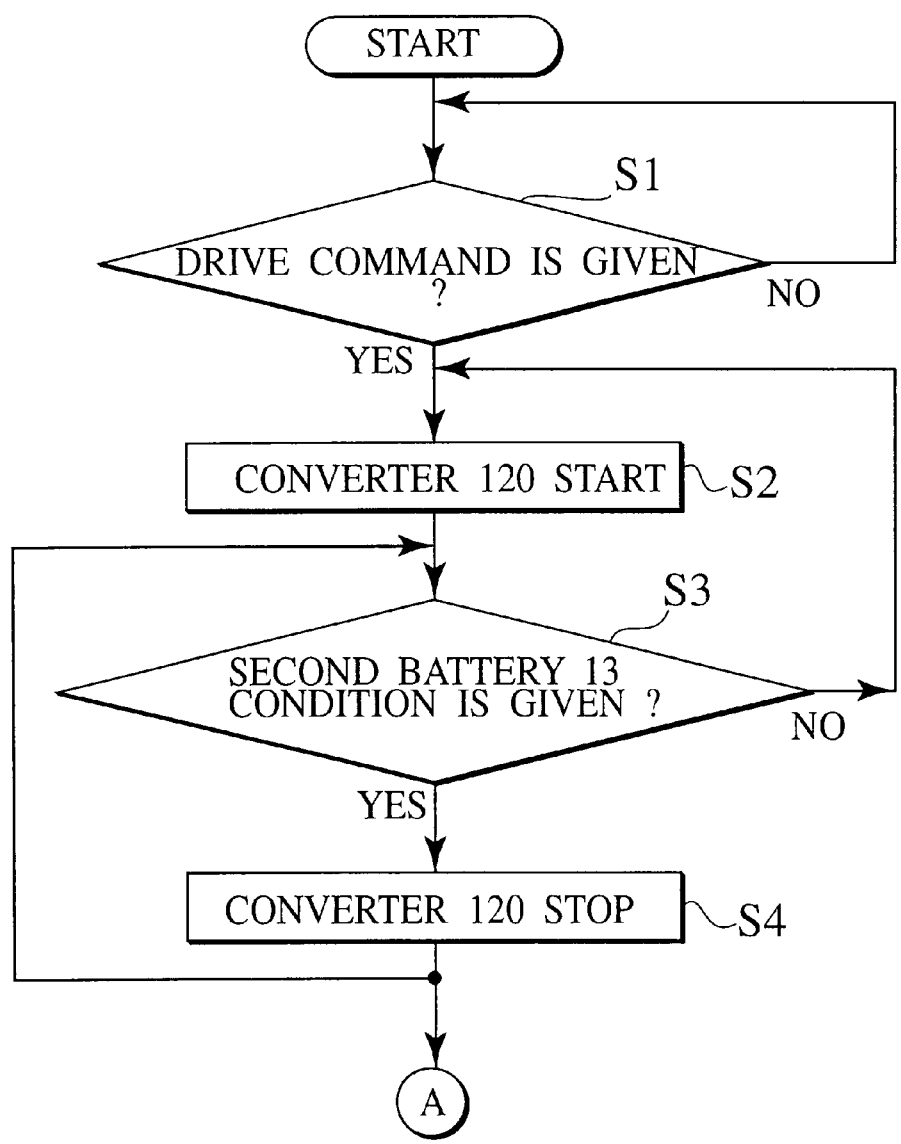
FIG. 4 is a flow chart showing a control procedure of first and second embodiments.

In case when the driving instruction signal instructing to drive the low voltage load 141 to $14_n$ is input from the LAN in vehicle during the stop of the voltage conversion operation by the voltage converter 120, the MPU 110 generates a control signal indicating to start the voltage conversion operation and transmits it to the voltage converter 120 (Step 1 in FIG. 4). In response to this control signal, the voltage converter 120 starts the voltage conversion operation (Step 2).

Thereby, the second battery 13 can be prevented from voltage drop along with the power supply start. In addition, as the voltage converter 120 starts the voltage conversion operation only when the driving instruction signal instructing to drive the low voltage load $14_l$ to $14_n$ is input, the second battery 13 without load can be prevented from excessive charge.

Third Embodiment

A power supply for a vehicle of this third embodiment provides the voltage converter 120 of the power supply for a vehicle according to the first embodiment with a step-up function. The power supply charges the first battery in case when the first battery at a high voltage lowers in the remaining capacity and the second battery at a lower voltage is in no load state and full charge state.

In general, when the first battery 12 at a high voltage has discharged, the first battery 12 can be charged by direct charging method with a high voltage, or the first battery 12 can be charged by stepping up the second battery 13. In the former method, the first battery 12 can be charged by connecting it directly to a battery at a high voltage mounted on another vehicle, for instance, however, the handling of the connection between high voltages is not easy.

While, in the latter method, the second battery 13 is connected to a battery at a low voltage mounted on another vehicle and the high voltage first battery 12 is charged by stepping up this second battery 13 in output, making the handling easier and more practical. This method has another advantage of allowing using a conventional charger, when the second battery 13 is charged directly.

On the other hand, it becomes necessary to charge the high voltage first battery 12 by stepping up this second battery 13 in output when the high voltage first battery 12 has discharged and there is no other car or charger. This is because the high voltage first battery 12 in output is used when the engine starts. However, in case when the second battery 13 has also discharged, the engine is possible not to be supplied with power necessary for starting.

Therefore, this power supply for a vehicle of the third embodiment is constituted to always monitor the first battery 12 in output by the MPU 110, and when it is required to be charged, the first battery 12 is charged at the timing when the second battery 13 becomes no load and full charge state.

This power supply for a vehicle of the third embodiment is different from the first embodiment in that a capacity sensor 170 (shown by the solid line in FIG. 1) for detecting the remaining capacity of the first battery 12 is provided to the first battery 12 at its input or output terminal of the block diagram shown in FIG. 1. It is also different from the first embodiment in the operation of the MPU 110 included in the power supply for a vehicle, the constitution and operation of the voltage converter 120. Now, only points different from the first embodiment will be described.

Figure 2:
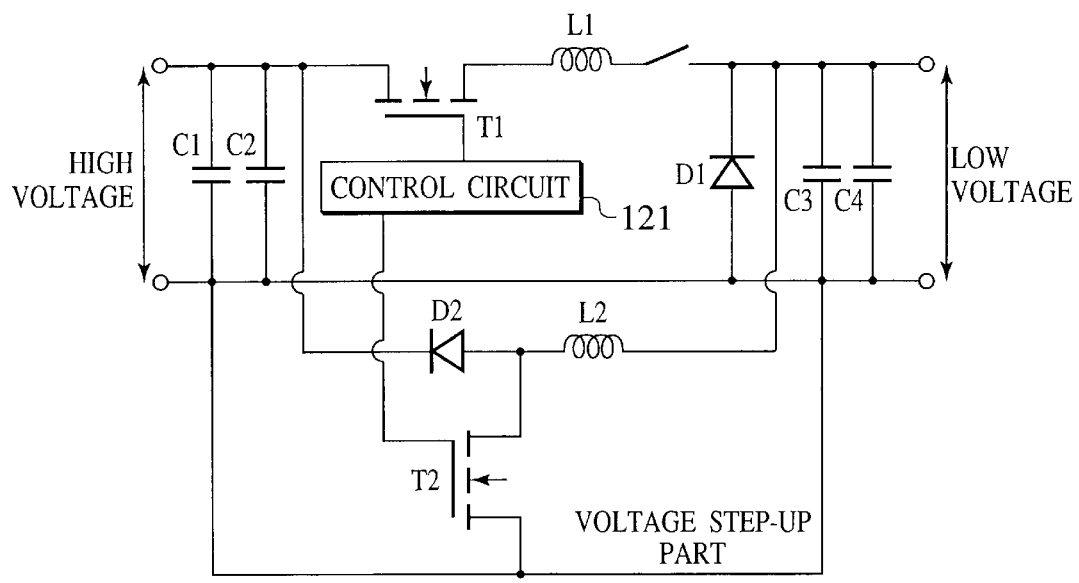
FIG. 2 is a block diagram showing a constitution of a voltage converter used for the power supply for a vehicle according to the third embodiment of the present invention.

FIG. 2 is a block diagram showing a constitution of a voltage converter 120 used for the power supply for a vehicle according to this third embodiments of the present invention. This voltage converter 120, called non-insulation type, uses the input or output terminal in common for step-up and step-down. As this voltage converter 120 is well known as a direct current chopper, it will be explained succinctly in the following. This voltage converter 120 includes capacitors C1 to C4, diodes D1 and D2, coils L1 and L2, power transistors T1 and T2 and a control circuit 121. The control circuit 121 functions in response to the control signal from the MPU 110.

To step down the voltage by this voltage converter 120, the rectangular pulse-wave voltage is generated when a high voltage impressed to the input or output terminal of the high voltage passes through the power transistor T1 turning ON or OFF under the control of the control circuit 121. This rectangular pulse-wave voltage is smoothed by the coil L1, diode D1 and capacitors C3, C4 and output to the input or output terminal of the low voltage, allowing thereby obtaining a low voltage from this input or output terminal.

On the other hand, in case of stepping up by this voltage converter 120, when a low voltage is impressed to the input or output terminal of the low voltage, the voltage is stepped up by accumulating and charging in the capacitors C1, C2 electric charges having passed through the coil L2 and the diode D2 by the power transistor T1 turning ON or OFF under the control of the control circuit 121 and outputting to the input or output terminal of the low voltage, allowing thereby to obtain a high voltage from this input or output terminal. The constitution for realizing this step-up corresponds to an inverse voltage converter of the present invention.

Figure 5:
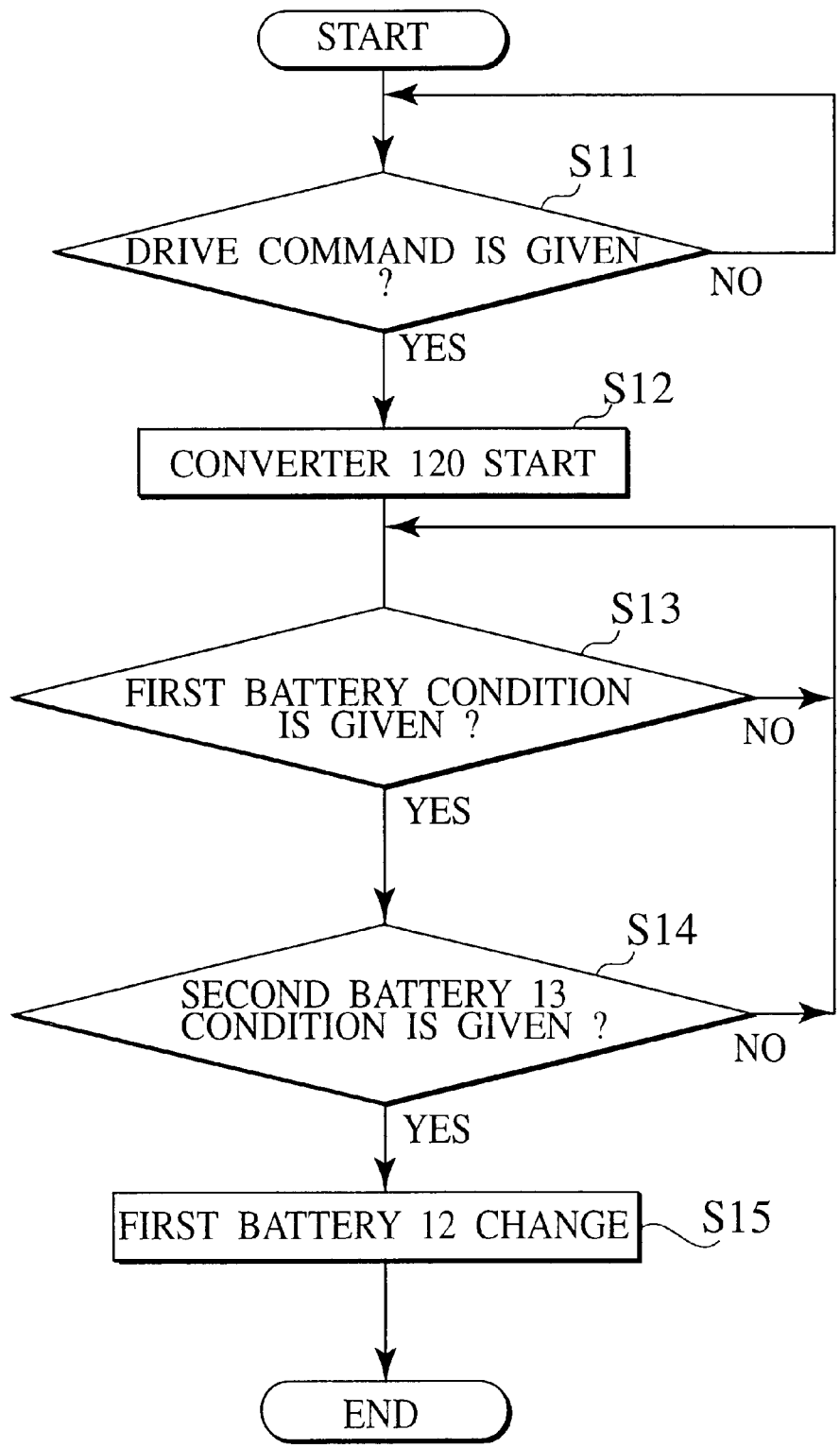
FIG. 5 is a flow chart showing a control procedure of a third embodiment.

In this power supply for a vehicle of the third embodiment, the MPU 110 functions as follows. In short, the MPU 110 always monitors the detected magnitude from the capacity sensor 170. Upon detecting that the detected magnitude from the capacity sensor 170 has become equal or under the predetermined magnitude (Step 13 in FIG. 5), it is checked if the second battery 13 is in no load state and full charge state (Step 14). This can be performed by the same method as the aforementioned first embodiment.

When it is detected that the second battery 13 is in no load state and full charge state, a control signal indicating to start stepping up is transmitted to the control circuit 121 in the voltage converter 120. Thereby, the voltage converter 120 steps up the second battery 13 output and supplies to the first battery 12, thereby charging the first battery 12 (Step 15).

According to the power supply for a vehicle of the third embodiment, a complete discharge of the first battery 12 can be prevented, because the first battery 12 is charged when the remaining capacity of the first battery 12 has become equal or under a fixed magnitude. Moreover, the deterioration of the second battery 13 by further take-out of current is prevented, when the remaining capacity of the second battery 13 is low, because the first battery 12 is charged under the condition that the second battery 13 is in no load state and full charge state.

Fourth Embodiment

This power supply for a vehicle of the fourth embodiment is the power supply for a vehicle of the third embodiment constituted to control the electric generation amount of the generator 10 in case of charging the first battery 12 by stepping up the second battery 13 in output.

The generator 10 supplies power directly to the first battery 12 at high voltage and the high voltage loads $15_l$ to $15_n$. As the electric generation capacity (maximum current magnitude) depends on the engine rpm or others, the rpm is increased when the load power consumption exceeds this. Also, even for the same rpm, the power generation amount is adjusted according to the required power consumption.

Figure 3:
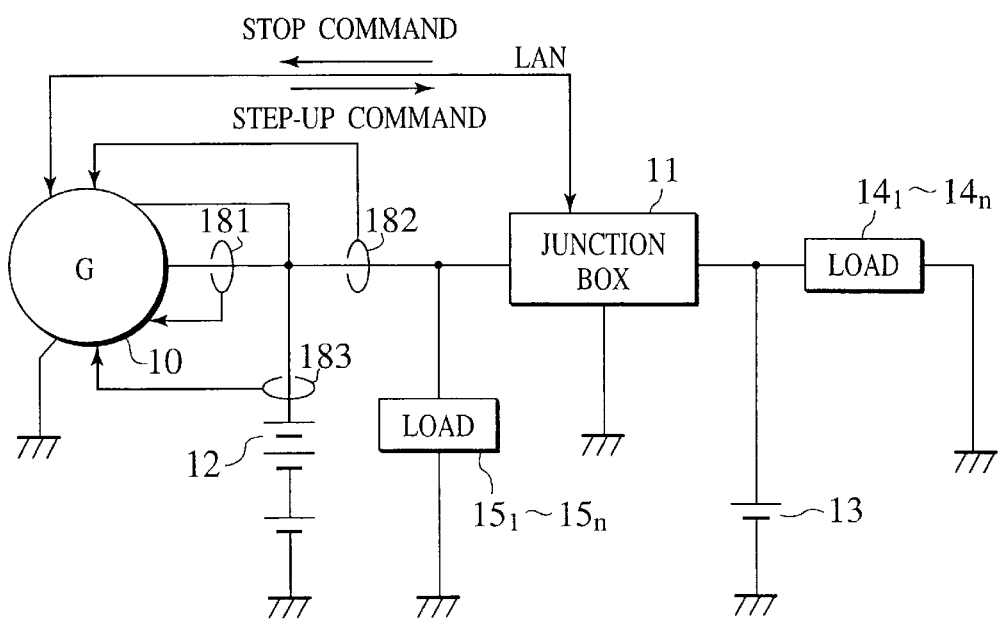
FIG. 3 is a block diagram showing a constitution of a power supply for a vehicle according to a fourth embodiment of the present invention.

FIG. 3 is a block diagram showing a constitution of a power supply for a vehicle according to this fourth embodiment of the present invention. The same symbol is affected to the same part as the first embodiment shown in FIG. 1.

The generator 10, as shown in FIG. 3, monitors the voltage, load current and charge current of the first battery 12 by means of sensors 181, 182, 183 provided in the periphery thereof. For instance, in case when a high voltage load $15_l$ to $15_n$ such as air-conditioner or the like is turned on, the rpm is controlled to increase automatically. This generator 10 is connected to the MPU 110 in the junction box 11 by the LAN in vehicle.

The MPU 110 informs the generator 10 that the second battery 13 is in no load state and full charge state and, therefore, the voltage converter 120 is stopped through the LAN in vehicle. Upon reception of this command, the generator 10 suppresses the power amount to be generated and controls not to increase the engine rpm (Step 23 in FIG. 6), in case when the high voltage loads $15_l$ to $15_n$ consume little energy (Step 21) and power to be required for charge of the first battery 12 is little or short (Step 22). Upon detecting that the first battery 12 voltage is lower than a predetermined magnitude (Step 24), the generator 10 transmits a step-up command to the MPU 110 through the LAN in vehicle. Receiving this step-up command, the MPU charges, the first battery 12 as explained for the aforementioned embodiment (Step 25).

According to the aforementioned power supply for a vehicle according to this fourth embodiment, in case when the low voltage side second battery 13 is in no load state and full charge state, excessive power is stepped up to supply to the first battery 12 at the high voltage, and at the same time, the fuel cost can be improved, as the power generation amount by the generator 10 is limited.

The entire content of Japanese Patent Applications P 2000-112613 (filed Apr. 13, 2000) is incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A power supply apparatus for a vehicle, comprising:
   a first battery for supplying power at a first voltage;
   a second battery for supplying power at a second voltage to a load;
   a converter between the first battery and the second battery for converting power from the first voltage and the second voltage in magnitude into each other; and
   a controller for operating the converter dependent on a first current in magnitude through the load and a second current in magnitude through the second battery.

2. A power supply apparatus for a vehicle according to claim 1, further comprising:
   a first sensor for detecting the first current in magnitude; and a second sensor for detecting the second current in magnitude, wherein the controller stops the converter when a first detected current is less in magnitude than first specified and a second detected current is less in magnitude than second specified.

3. A power supply apparatus for a vehicle according to claim 1, further comprising:

a switch between the second battery and the load for switching in response to the controller; and a second sensor for detecting the second current in magnitude, wherein the controller stops the converter when the switch opens and a second detected current is less in magnitude than specified.

4. A power supply apparatus for a vehicle according to claim 1, further comprising:

a third sensor for detecting a third current outputted from the converter, wherein the controller stops the converter when a third detected current is less in magnitude than specified and has a ripple greater in level than specified.

5. A power supply apparatus for a vehicle according to claim 1, wherein the converter starts to convert voltage when power starts to be supplied to the load.

6. A power supply apparatus for a vehicle according to claim 1, wherein the controller operates the converter to convert power from the second voltage to the first voltage based on the first current and the second current in magnitude for charging the first battery.

7. A power supply apparatus for a vehicle according to claim 6, further comprising:

a generator for generating power and for charging the first battery, wherein the controller operates the generator to be reduced in amount of power generation.

8. A power supply apparatus for a vehicle according to claim 1, further comprising:

another load for supplying power from the first battery.

* * * * *

UNITED STATES PATENT AND TRADEMARK OFFICE
CERTIFICATE OF CORRECTION

PATENT NO.    : 6,580,180 B2
DATED         : June 17, 2003
INVENTOR(S)   : Yasuhiro Tamai et al.

It is certified that error appears in the above-identified patent and that said Letters Patent is hereby corrected as shown below:

<u>Title page,</u>
Item [57], ABSTRACT,
Line 7, "120 in dependent" should read -- 120 dependent --.

Signed and Sealed this

Seventh Day of October, 2003

JAMES E. ROGAN
*Director of the United States Patent and Trademark Office*